United States Patent
Yahagi et al.

(10) Patent No.: US 7,739,803 B2
(45) Date of Patent: Jun. 22, 2010

(54) SURVEYING SYSTEM (75) Inventors: Kazuyoshi Yahagi, Itabashi-ku (JP);
Masaaki Kobayashi, Itabashi-ku (JP);
Terukazu Nagashima, Itabashi-ku (JP);
Yoshikatsu Miyao, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 17 days.

(21) Appl. No.: 12/313,556

(22) Filed: Nov. 21, 2008

(65) Prior Publication Data
US 2009/0144995 A1    Jun. 11, 2009

(30) Foreign Application Priority Data
Dec. 7, 2007    (JP) ............................ 2007-317155

(51) Int. Cl.
*G01C 3/00* (2006.01)
*G01C 1/02* (2006.01)
*G01C 15/06* (2006.01)

(52) U.S. Cl. ............................ 33/290; 33/293; 33/294; 356/139.04

(58) Field of Classification Search .................. 33/290, 33/292, 293, 294; 356/153, 139.04
See application file for complete search history.

(56) References Cited

U.S. PATENT DOCUMENTS

| 4,029,415 | A | * | 6/1977 | Johnson ..................... 356/4.08 |
| 4,653,910 | A | * | 3/1987 | Poling ...................... 356/141.3 |
| 4,820,041 | A | * | 4/1989 | Davidson et al. ........... 356/3.12 |
| 5,467,290 | A | * | 11/1995 | Darland et al. ............. 342/463 |
| 5,551,159 | A | * | 9/1996 | Mooty ........................ 33/228 |
| 5,666,792 | A | * | 9/1997 | Mullins .................... 56/10.2 A |

(Continued)

FOREIGN PATENT DOCUMENTS

EP    1 411 371 A1    4/2004

(Continued)

OTHER PUBLICATIONS

The EP communication dated Feb. 12, 2010 in co-pending foreign application (08169861.5).

*Primary Examiner*—Christopher W Fulton
(74) *Attorney, Agent, or Firm*—Nields, Lemack & Frame, LLC (57) ABSTRACT

The present invention provides a surveying system, which comprises a surveying device 1 provided with a function for tracking a target 13, and a remote control device 16 for remotely controlling the surveying device on a target side, said surveying device comprises a measuring unit 21, an image pickup unit 23, a first radio unit 33, and a first control arithmetic unit 29, said remote control device comprises a second radio unit 37, a second control arithmetic unit 35, a second display unit 18 and a second operation input unit 20, said first control arithmetic unit transmits measurement data of the measuring unit to the remote control device via the first radio unit when a detection result is within the tracking range based on the detection result of a reflection light from the target, and transmits an image data taken by the image pickup unit via the first radio unit when the detection result is out of the tracking range, said second control arithmetic unit receives the measurement data and the image data via the second radio unit, and the measurement data or the image data are displayed on the second display unit.

7 Claims, 8 Drawing Sheets

U.S. PATENT DOCUMENTS

| | | | |
|---|---|---|---|
| 5,671,160 A * | 9/1997 | Julian | 702/94 |
| 6,023,326 A * | 2/2000 | Katayama et al. | 356/141.3 |
| 6,137,569 A | 10/2000 | Sasaki et al. | 356/153 |
| 6,462,810 B1 | 10/2002 | Muraoka et al. | 356/139.04 |
| 6,505,406 B2 * | 1/2003 | Robertson et al. | 33/1 G |
| 6,791,492 B2 | 9/2004 | Miyasaka et al. | |
| 7,168,174 B2 * | 1/2007 | Piekutowski | 33/286 |
| 2001/0045534 A1 | 11/2001 | Kimura | |
| 2005/0172503 A1 * | 8/2005 | Kumagai et al. | 33/290 |
| 2008/0120856 A1 | 5/2008 | Matsuo et al. | |

FOREIGN PATENT DOCUMENTS

| | | |
|---|---|---|
| JP | 07-083658 | 3/1995 |
| JP | 07-180107 | 7/1995 |
| JP | 7-198383 | 8/1995 |
| JP | 11-237244 | 8/1999 |
| JP | 2000-346645 | 12/2000 |
| JP | 2004-170354 | 6/2004 |
| WO | 2007/048425 A1 | 5/2007 |

* cited by examiner

SURVEYING SYSTEM

BACKGROUND OF THE INVENTION

The present invention relates to a surveying system, in particular, the invention relates to a surveying system for tracking a target.

As a surveying device for measuring a distance, a horizontal angle and a vertical angle, a surveying device provided with a tracking function has been known in the past. In this type of the surveying device, an object reflector (target) such as a corner cube is collimated by a collimating telescope provided on the surveying device. A tracking light is projected from the collimating telescope, and when the target is moved, a reflection light from the target is received and the target can be automatically tracked.

Normally, in the surveying device provided with the tracking function, no operator is assigned on a side where the surveying device is installed and a surveying operator carried out an operation on a side of the target. For instance, a target installed on a pole or the like is held by the surveying operator, and the operation is carried out by a remote controller. Also, the target is moved by the surveying operator for each measuring point, and in the surveying device, the target is tracked by detecting a reflection light from the target.

Or, the target is installed on a pole erected at a required position on a construction machine such as a bulldozer. The operator operates the construction machine such as a bulldozer, and operation such as ground leveling is carried out by the construction machine based on a reference plane formed by the surveying device or based on the results obtained by the measurement. The surveying device tracks the target in association with the movement of the construction machine.

However, when the moving speed of the target exceeds the following speed of the surveying device and the target moves out of a visual field of the collimating telescope or when an obstacle such as a tree, a vehicle, a person, etc. is temporarily positioned between the surveying device and the target and an optical path of the collimating telescope is intercepted by the obstacle, the surveying device cannot receive a reflection light from the target, and a tracking may be interrupted.

The reason for this is that, in a collimating telescope generally in use, a field angle (an angle of view) is as small as about 1° and the reason is caused by that the range to detect the reflection light for purpose of tracking is too narrow.

When the tracking of the target is interrupted, the surveying device starts the operation to search the target. In the searching operation, the collimating telescope is rotated within a predetermined range in up-to-bottom direction and in left-to-right direction while the tracking light is projected, a scanning is carried out, and the target is detected.

As described above, the field angle of the collimating telescope is small. In order to re-detect the target, it is necessary to have a finer scanning pitch and to increase the number of scanning operations.

For this reason, when the tracking is interrupted, much time is required for the purpose of detecting the target again and for starting the tracking operation. Further, under working conditions where the optical path is frequently intercepted by the obstacle, there are problems in that the working efficiency of the measurement operation is extremely decreased.

The surveying device provided with the tracking function is disclosed in JP-A-07-198383, JP-A-2000-346645, and JP-A-2004-170354.

SUMMARY OF THE INVENTION

It is an object of the present invention to provide a surveying system for tracking a target, by which it is possible to make the surveying device quickly return to a condition where tracking can be made when the surveying device misses the target and the tracking operation is interrupted.

To attain the above object, the present invention provides a surveying system, which comprises a surveying device provided with a function for tracking a target, and a remote control device for remotely controlling the surveying device on a target side, the surveying device comprises a measuring unit, an image pickup unit, a first radio unit, and a first control arithmetic unit, the remote control device comprises a second radio unit, a second control arithmetic unit, a second display unit, and a second operation input unit, the first control arithmetic unit transmits measurement data of the measuring unit to the remote control device via the first radio unit when a detection result is within the tracking range based on the detection result of a reflection light from the target, and transmits an image data taken by the image pickup unit via the first radio unit when the detection result is out of the tracking range, the second control arithmetic unit receives the measurement data and the image data via the second radio unit, and displays the measurement data or the image data on the second display unit.

Also, the present invention provides the surveying system as described above, wherein, under a condition when an image of the second display unit is displayed, a correction data in a collimating direction is transmitted to the surveying device via the second radio unit by the second operation input unit based on a display condition of the image, the first control arithmetic unit receives the corrected data via the first radio unit, and the correction is made so that the collimating direction is within the tracking range. Further, the present invention provides the surveying system as described above, wherein the second display unit has a touch panel with the function to operate as an operation unit, and the correction data of the collimating direction to direct the collimating direction toward the light can be acquired by designating a position of the target as displayed on the second display unit. Also, the present invention provides the surveying system as described above, wherein, when the target is not displayed on the second display unit, a command for magnification change inputted from the second operation unit is transmitted to the surveying device so that magnification of the image data acquired by the image pickup unit can be changed. Further, the present invention provides the surveying system as described above, wherein the measuring unit can measure a distance in a prism measurement mode and in a nonprism measurement mode, an image taken by the image pickup unit is displayed on the second display unit in the nonprism measurement mode, and a distance to a designated position can be measured by designating a required position in the image. Also, the present invention provides the surveying system as described above, wherein the correction data of the collimating direction to direct the collimating direction toward the target can be acquired by designating the position of the target displayed on the second display unit by the second operation input unit.

The present invention provides a surveying system, which comprises a surveying device provided with the function for tracking a target, and a remote control device for remotely controlling the surveying device on a target side, the surveying device comprises a measuring unit, an image pickup unit, a first radio unit, and a first control arithmetic unit, the remote control device comprises a second radio unit, a second control arithmetic unit, a second display unit, and a second operation input unit, the first control arithmetic unit transmits measurement data of the measuring unit to the remote control device via the first radio unit when the detection result is within the tracking range based on the detection result of a reflection light from the target, and transmits an image data taken by the image pickup unit via the first radio unit when the detection result is beyond the tracking range, the second control arithmetic unit receives the measurement data and the image data via the second radio unit, and displays the measurement data or the image data on the second display unit. As a result, an operator can promptly recognize that the tracking operation by the surveying device is interrupted and can judge, from the condition of an image, as to under which condition the tracking operation has been interrupted. Then, adequate action can be taken.

Also, present invention provides the surveying system as described above, wherein, under the condition when an image of the second display unit is displayed, the correction data in the collimating direction is transmitted to the surveying device via the second radio unit by the second operation input unit based on a display condition of the image, the first control arithmetic unit receives the corrected data via the first radio unit, and the correction is made so that the collimating direction is within the tracking range. This makes it possible to issue a command to adequately correct the collimating direction to the surveying device so that the surveying device can promptly return to the condition where tracking can be carried out.

Further, present invention provides the surveying system as described above, wherein the second display unit has a touch panel with the function to operate as an operation unit, and the correction data of the collimating direction to direct the collimating direction toward the light can be acquired by designating a position of the target as displayed on the second display unit. This makes it possible to issue a command to adequately correct the collimating direction to the surveying device so that the surveying device can promptly return to the condition where tracking can be carried out.

Also, present invention provides the surveying system as described above, wherein, when the target is not displayed on the second display unit, a command for magnification change inputted from the second operation unit is transmitted to the surveying device so that magnification of the image data acquired by the image pickup unit can be changed. As a result, when the target is extremely deviated from the tracking range, it is possible to easily recognize the position of the target.

Further, present invention provides the surveying system as described above, wherein the measuring unit can measure a distance in a prism measurement mode and in a nonprism measurement mode, an image taken by the image pickup unit is displayed on the second display unit in the nonprism measurement mode, and a distance to a designated position can be measured by designating a required position in the image. Thus, it is possible to execute a distance measuring operation at a position as desired even in the nonprism measurement.

BRIEF DESCRIPTION OF THE DRAWINGS

In another embodiment of the invention, FIG. 8(A) shows a display image to show where a condition where the collimation is made to the target, and FIG. 8(B) is a drawing of a display image to show a condition where the target is out of the tracking range.

DETAILED DESCRIPTION OF THE PREFERRED EMBODIMENTS

Description will be given below on the best aspect for carrying out the invention by referring to the attached drawings.

The surveying system according to the present invention comprises a surveying device and a remote control device provided on the side of the target. The surveying device is provided with the tracking function, and the surveying device and the remote control device can transmit and receive data to and from each other by communication means such as radio communication means.

First, referring to FIG. 1, description will be given on an example of the surveying device to be used in the surveying system according to the present invention.

Figure 1:
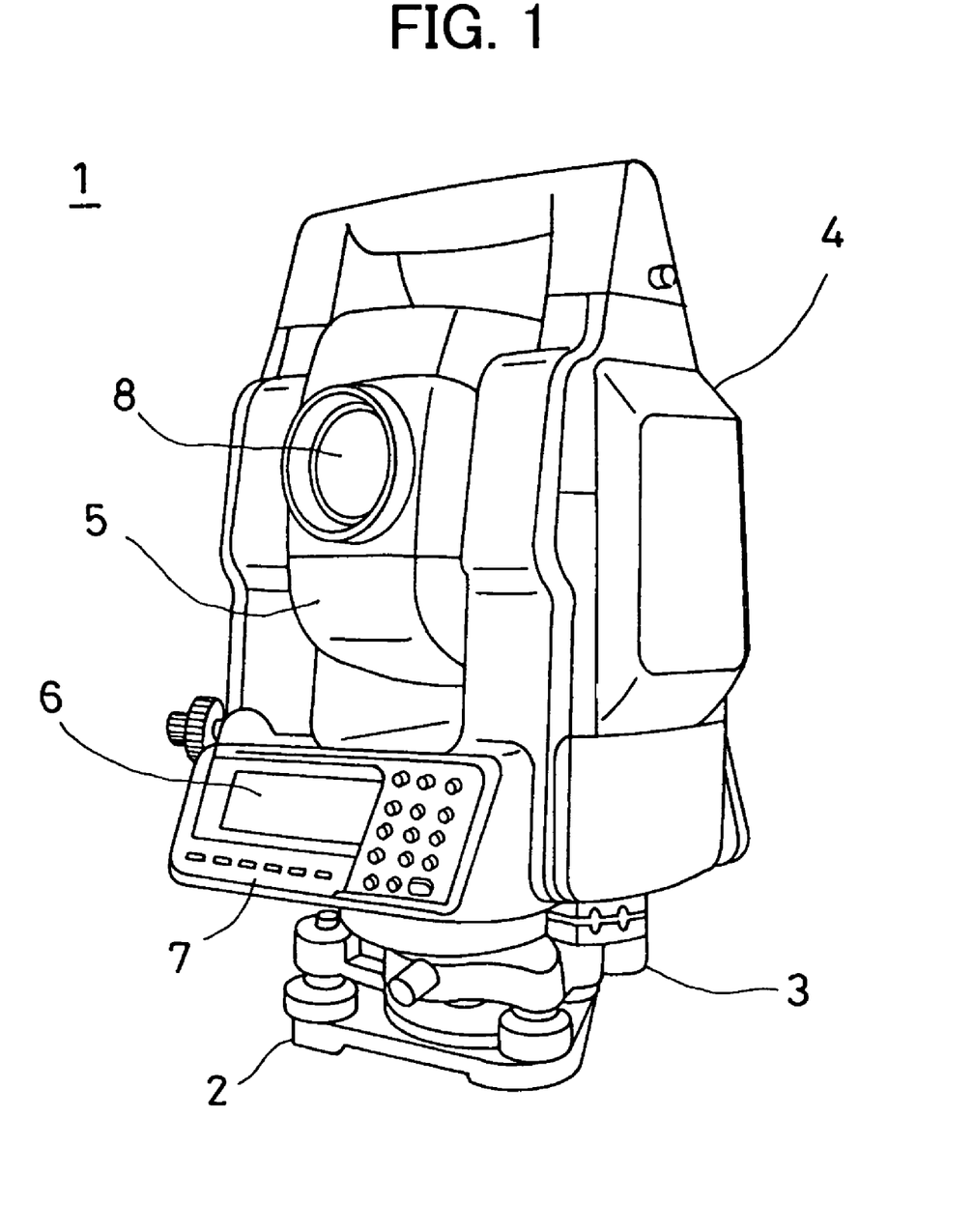
FIG. 1 is a perspective view of an example of a surveying device to be used in the surveying system according to the present invention.

The surveying system 1 as shown in FIG. 1 is a total station. A pulsed laser beam is projected to a measuring point (target). By receiving a pulsed reflection light from the measuring point, the distance is measured for each pulse. The results of the distance measurement are averaged. As a result, the distance can be measured with high accuracy.

The surveying device 1 primarily comprises a leveling unit 2 installed on a tripod (not shown), a base unit 3 mounted on the leveling unit 2, a frame unit 4 rotatably mounted on the base unit 3 around the vertical axis, and a telescope unit 5 rotatably mounted on the frame unit 4 around the horizontal axis.

The frame unit 4 is provided with a first display unit 6 and a first operation input unit 7. The telescope unit 5 has a telescope 8 for collimating the target and an image pickup unit 23 (to be described later) for acquiring an image in collimating direction via an optical system of the telescope 8. A photodetection element, which is provided on the image pickup unit 23, is an assembly of pixels, for instance, CCD, CMOS, etc., and a position of each pixel, which receives the light, can be identified and a field angle can be obtained from the position of the pixel. Not only the image pickup unit 23 may be designed as a single photodetection element, but also a photodetection element for acquiring the image in the collimating direction and another photodetection element for tracking purpose may be separately provided.

Figure 2:
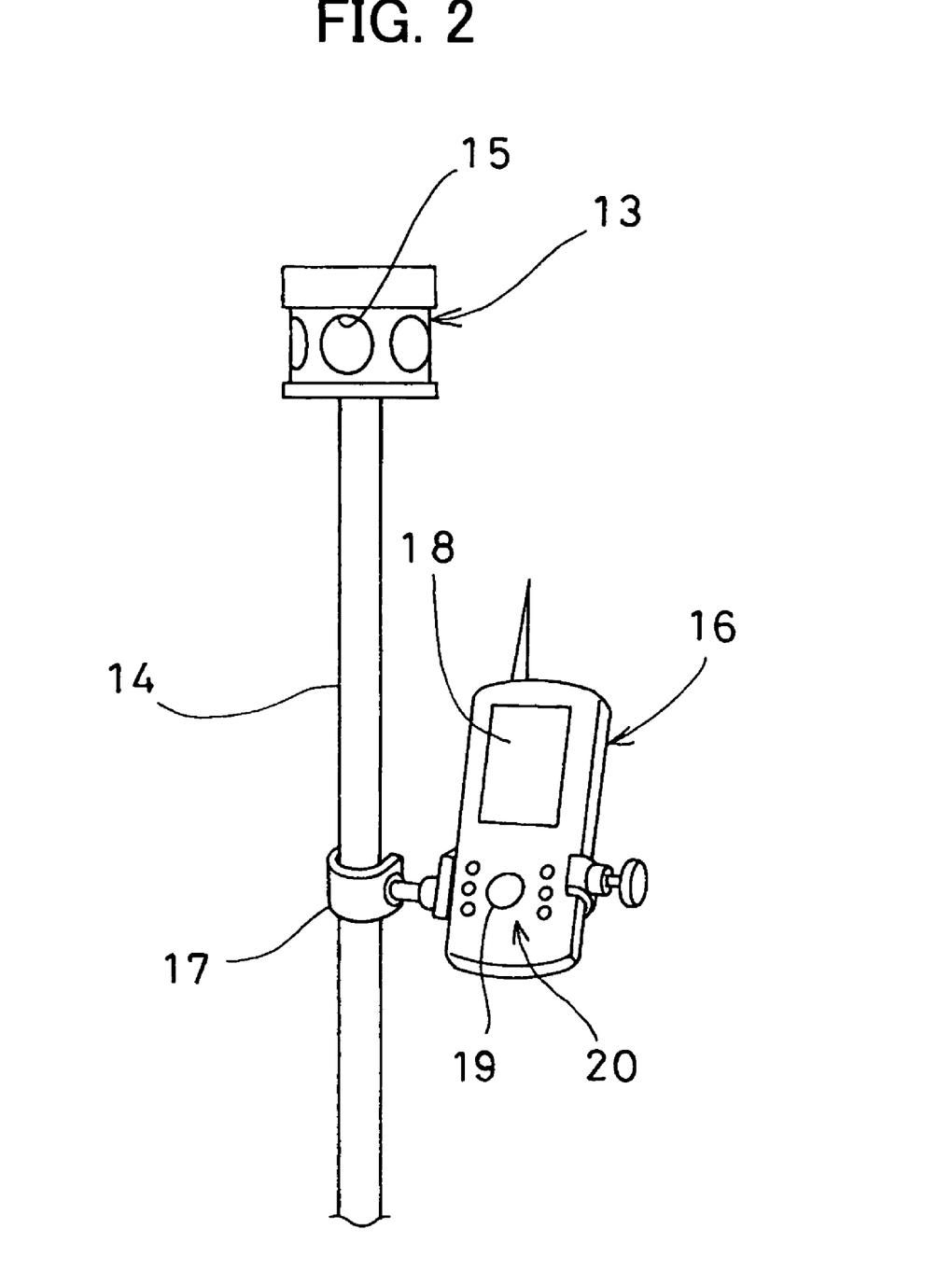
FIG. 2 is a perspective view to show a target and a remote control device to be used on the surveying system.

FIG. 2 shows the target 13 and a remote control device 16 to be used in the surveying system according to the invention.

FIG. 2 shows a case where a target 13 is mounted on an upper end of a pole 14. The target 13 is provided with a plurality of prisms 15 so that tracking lights from the surveying device 1 can be received from all circumferential directions and reflected.

The remote control device 16 is mounted on the pole 14 via a fixture 17, and a surveying operator can manipulate the remote control device 16 by a single hand when the operator is holding the pole 14.

The remote control device 16 has a second display unit 18 designed with a touch panel and a second operation input unit 20 or the like provided with an operation button 19 or the like. The surveying device 1 and the remote control device 16 can transmit and receive data to and from each other by communication means such as radio communication means.

Figure 3:
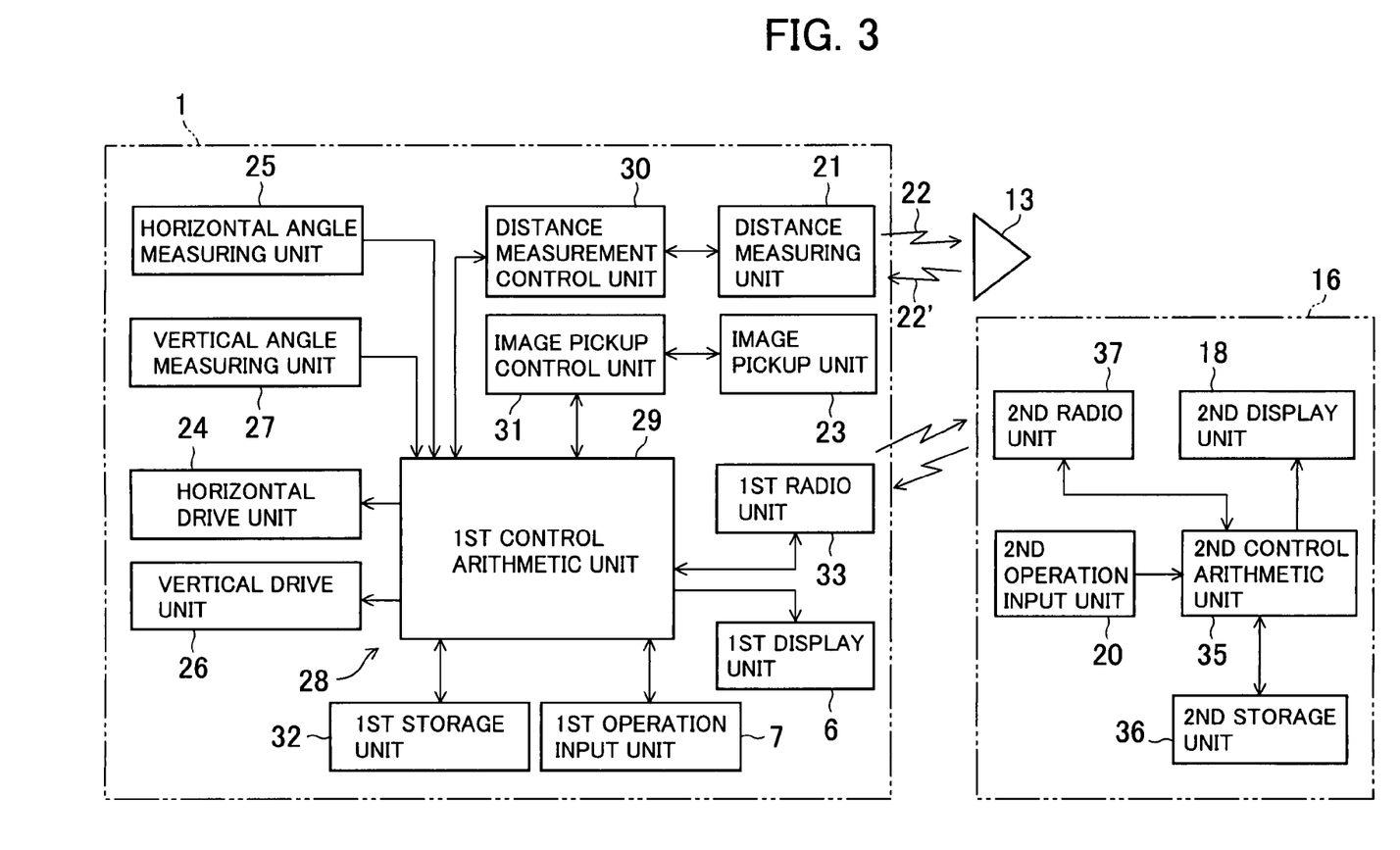
FIG. 3 is a schematical block diagram to show an embodiment of the present invention.

Now, referring to FIG. 3, description will be given on an approximate arrangement of the system.

First, the surveying device 1 will be described.

The telescope unit 5 is incorporated with a distance measuring unit 21 having a distance measuring light optical system, and the distance measuring unit 21 projects a distance measuring light 22 and receives a reflection light 22' from the target 13. Thus, an electro-optical (light wave) distance measurement to the target 13 can be carried out. Further, the telescope unit 5 provides an image pickup unit 23 with an optical system, and the optical system is common with an optical system of the distance measuring light optical system.

The frame unit 4 is provided with a horizontal drive unit 24 for rotating the frame unit 4 in horizontal direction. It is also provided with a horizontal angle measuring unit 25, which detects a horizontal rotation angle with respect to the base unit 3 on the frame unit 4 and also detects a horizontal angle in the collimating direction. Also, the frame unit 4 is provided with a vertical drive unit 26 for rotating the telescope unit 5 around the horizontal axis, and it is also provided with a vertical angle measuring unit 27, which detects a vertical angle of the telescope unit 5 and measures a vertical angle in the collimating direction. The distance measuring unit 21, the horizontal angle measuring unit 25 and the vertical angle measuring unit 27 make up together a measuring unit.

The frame unit 4 includes a control device 28. The control device 28 controls the driving of the horizontal drive unit 24 and of the vertical drive unit 26 and collimates the telescope unit 5 in a predetermined direction by rotating the frame unit 4 and the telescope unit 5, scans the light over a predetermined range, and switches over optical magnification of the telescope 8, or acquires an image in the collimating direction by the image pickup unit 23. Further, the control device 28 controls the changeover of electrically processed magnification of the acquired image, an image with the magnification as required is obtained. Also, the control device 28 controls the distance measuring unit 21. Thus, a distance to the target 13 is measured.

The control device 28 primarily comprises a first control arithmetic unit 29, a distance measurement control unit 30, an image pickup control unit 31, a first storage unit 32, a first radio unit 33, a first display unit 6, a first operation input unit 7, etc.

The results of measurement are inputted to the first control arithmetic unit 29 from the distance measuring unit 21, the horizontal angle measuring unit 25, and the vertical angle measuring unit 27, and a distance, a horizontal angle and a vertical angle are measured respectively. The results of measurement are stored in the first storage unit 32 via the first control arithmetic unit 29 and are displayed on the first display unit 6.

The first storage unit 32 has a program storage area for storing different types of programs and a data storage area for storing data such as the measurement results. In the program storage area, various types of programs are stored. These programs include: a calculation program necessary for measurement, an image processing program for performing the image processing as to be described later, a prism measurement program for selecting measuring point from a processed image and for carrying out the distance measurement on the selected measuring point (target), a nonprism measurement program for carrying out measurement at a point other than the target, a measurement mode changeover program for realizing a measurement mode under the measuring condition suitable for the changed mode, a sequence program for tracking the measuring point, a search program for searching the target 13 when the measurement is started or when the target is missed, an image display program for displaying an image on the first display unit 6, and other programs.

The image pickup control unit 31 controls the acquisition of an image by the image pickup unit 23 and processes the image data thus acquired. Also, the image pickup control unit 31 can calculate a position of the target based on a photodetection signal from the photodetection element when the reflection light 22' enters the photodetection element of the image pickup unit 23.

The image pickup control unit 31 can convert the photodetection signal from the photodetection element to a video signal and can display the image thus picked up on the first display unit 6 at real time.

The first radio unit 33 is designed to transmit measurement data such as a distance measurement data, angle measurement data, etc., and image data and video signal to the remote control device 16, and it is also designed to receive an operation command from the remote control device 16.

Next, description will be given on the remote control device 16.

The remote control device 16 primarily comprises a second control arithmetic unit 35, a second storage unit 36, a second radio unit 37, a second display unit 18, a second operation input unit 20, etc.

In the second storage unit 36, the following programs are stored: a communication program for performing radio communication with the surveying device 1, a control command program for converging operation from the second operation input unit 20 or operation from the second display unit (touch panel) 18 to a control command signal and for transmitting the control command signal to the surveying device 1 via the second radio unit 37, an image display program for displaying measurement data or a video signal from the surveying device 1 on the second display unit 18, a coordinate position calculating program for calculating a position on the second display unit 18, and other programs. The second storage unit 36 has a data storage unit on a part of it, and measurement data and image data associated with the measurement data are stored in the data storage unit. If necessary, measurement schedule, measurement topographical data and measuring operation supplementary data such as measuring point are stored. When the operator calls via the second operation input unit 20, adequate operation supplementary information is displayed on the second display unit 18.

Figure 4:
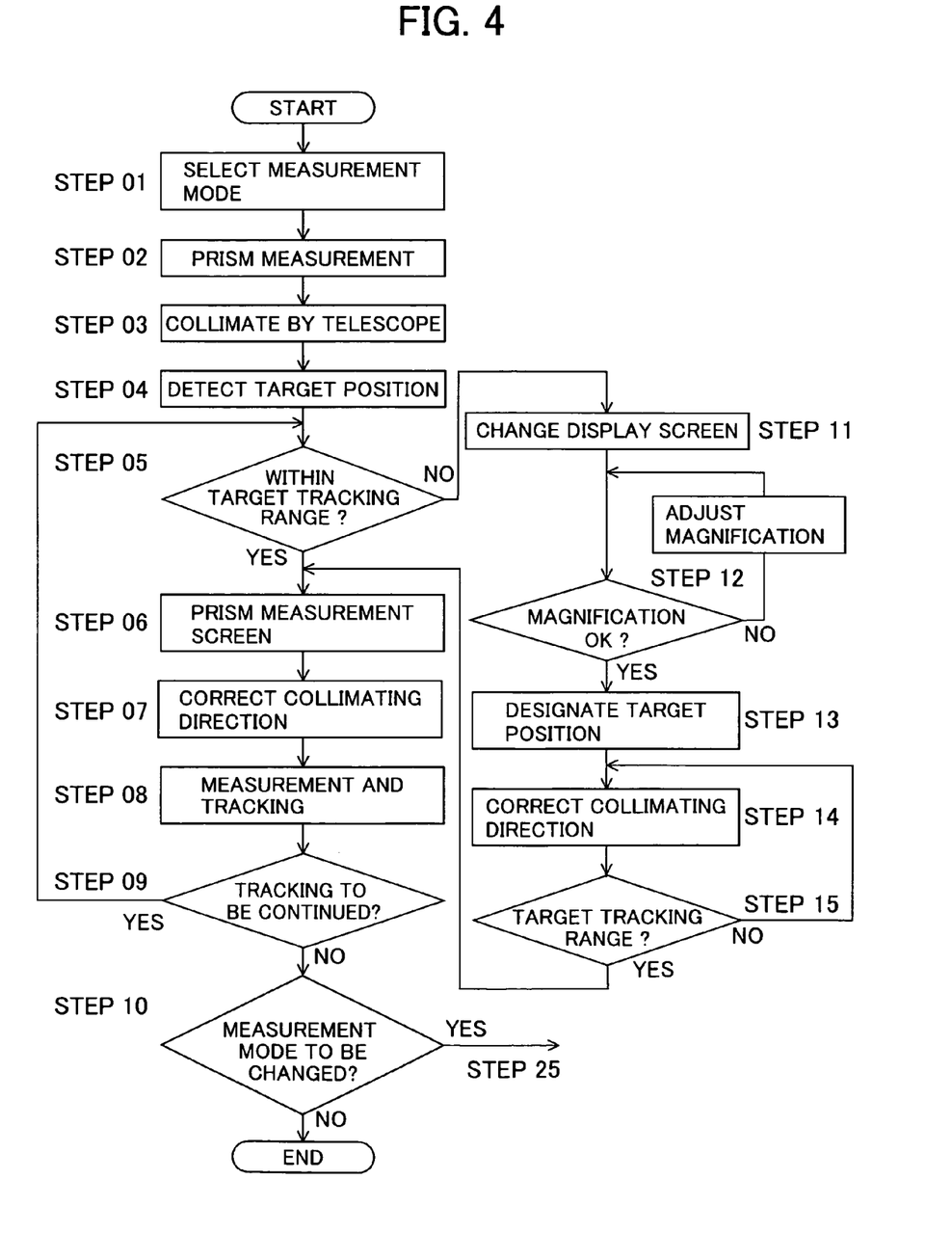
FIG. 4 is a flow chart to show operation of the embodiment of the invention.
Figure 5:
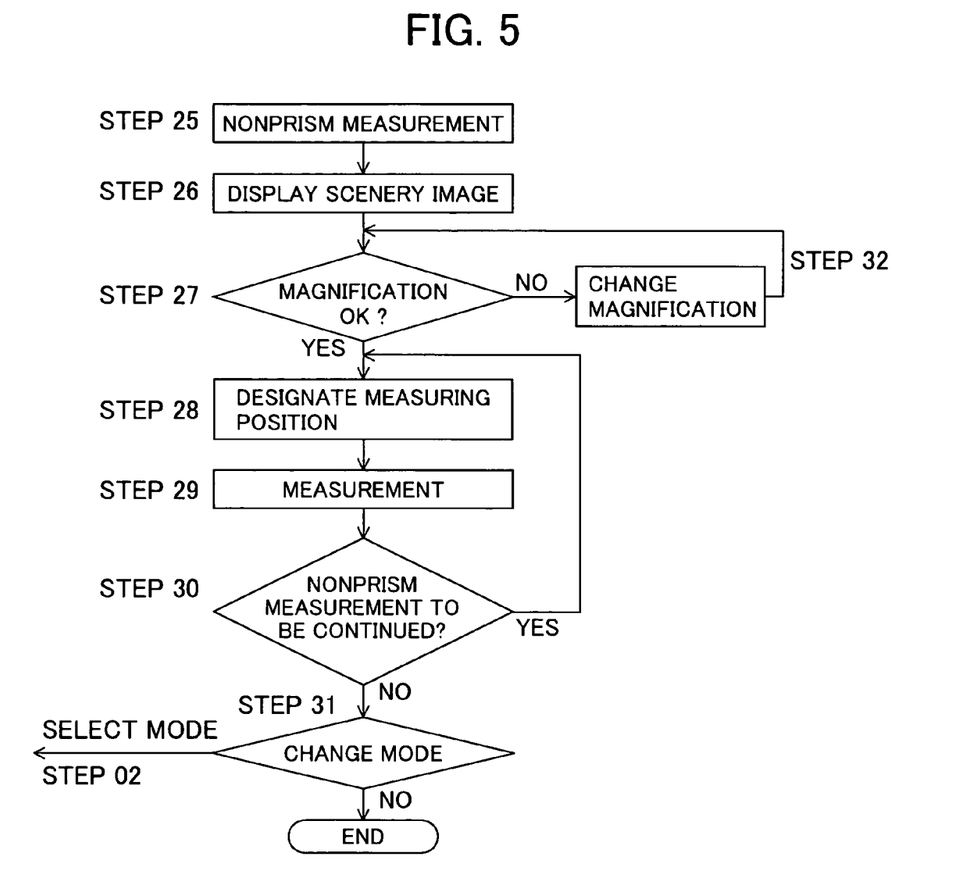
FIG. 5 is a flow chart to show operation of the embodiment of the invention.

Now, referring to FIG. 4 and FIG. 5, description will be given on operation in the present invention.

The target 13 is installed at the measuring point, and power is connected to the surveying device 1.

(Step 1) As the initial setting after the connection of power, measurement mode is selected whether it is a prism measurement mode or a nonprism measurement mode. If the measurement mode is not set, it is made to automatic setting, e.g. to prism measurement mode (Step 02). Description will be given below on a case where it is first set to the prism measurement mode. In the initial condition, a scene (image data) taken by the image pickup unit 23 is displayed on the first display unit 6. Video data is also transmitted to the remote control device 16, and the same scene is displayed on the second display unit 18. In some cases, the same scene is not displayed and measurement screen (such as measuring point information) may be displayed. In such case, the same scene can be displayed through input operation by the operator.

Figure 6A:
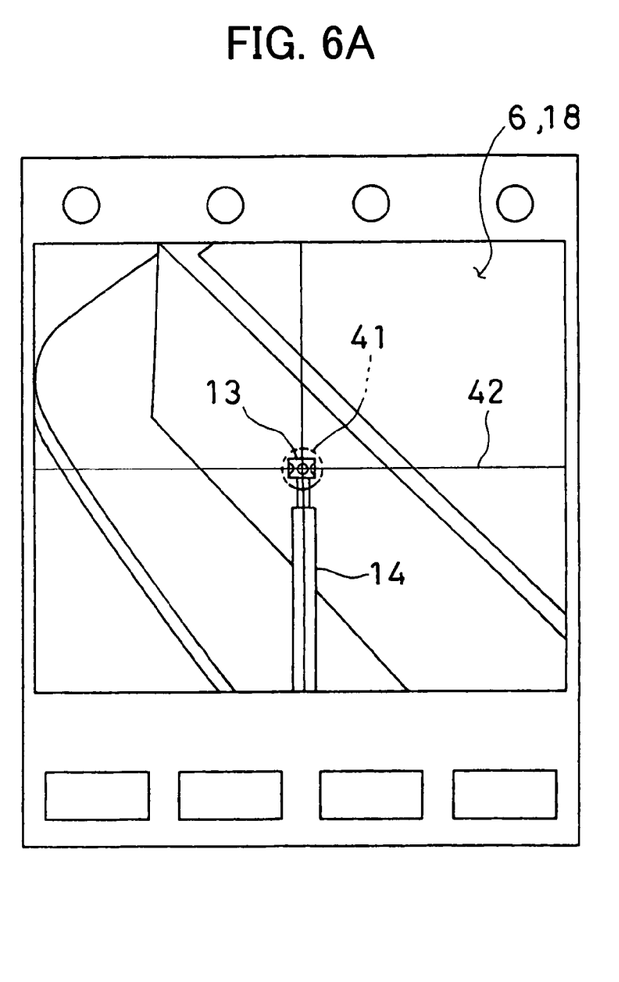
FIG. 6(A) is a drawing of a display image to show a condition where it is collimated to the target.
Figure 6B:
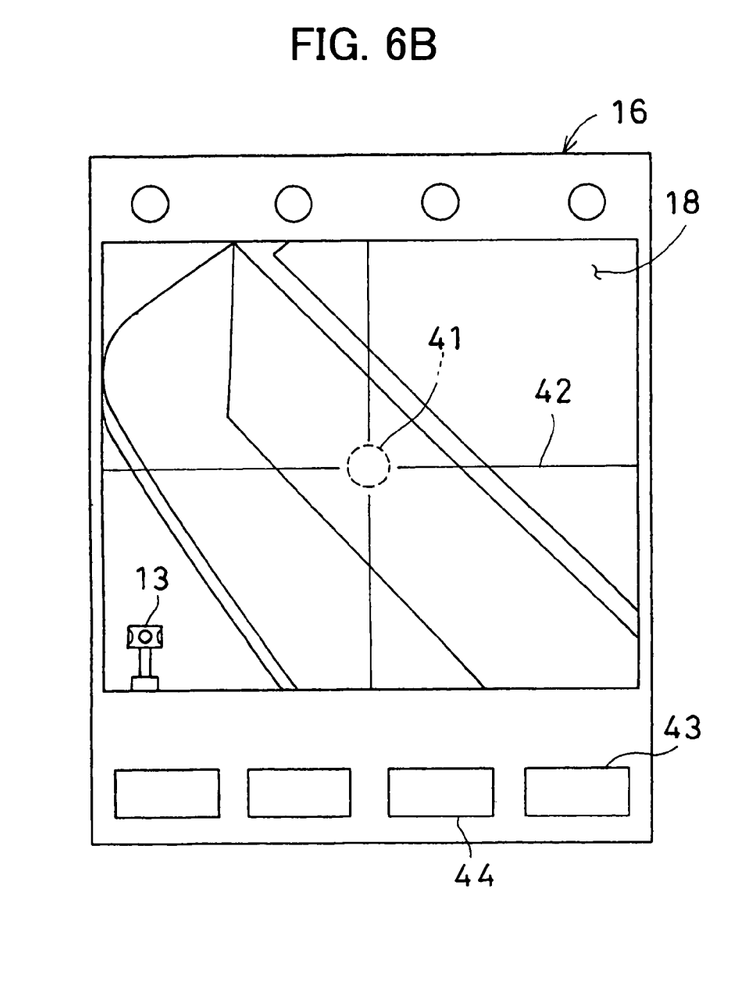
FIG. 6(B) is a drawing of a display image to show a condition where the target is out of the tracking range.

(Step 03) The target 13 is collimated by the telescope 8, and it is confirmed that the target 13 is within a range where can be tracked in the visual field of the telescope 8 (e.g. within a predetermined radius around the collimating point). Then, measurement and tracking are started. FIG. 6 shows initial screens. On the screens, the range where can be tracked is indicated by a dotted circle 41 or the range is designated by a mark where the central portion of a target line 42 is lacking.

(Step 04 and Step 05) Based on an image signal from the image pickup unit 23, the target 13 is detected, and the field angle is determined from the position on the image of the target 13. From the field angle thus obtained, it is judged whether the direction of the target 13 is in the range where the target can be tracked.

(Step 06) If the target is within the range where can be tracked, at least the second display unit 18 among the first display unit 6 and the second display unit 18 is changed to a prism measurement screen, and information relating to the measurement (measurement data) such as a measuring position, the distance measurement data, angle measurement data, etc. is displayed on the second display unit 18.

(Step 07) The collimating direction is corrected, and measurement and tracking are started.

(Step 08) The target is tracked and the distance measurement and angle measurement are continuously carried out. The results of measurement are transmitted to the second radio unit 37 by the first radio unit 33 at real time, and the measurement data are stored on the second storage unit 36 and are displayed on the second display unit 18.

(Step 09 and Step 10) When a command to stop the tracking is issued from the remote control device 16, it is confirmed whether the change of the measurement mode to the nonprism measurement mode is required or not. If the change of the measurement mode is not needed, the measuring operation is terminated.

(Step 11) As the result of the detection of the position of the target in Step 04, if the direction of the target 13 is out of the range where the target can be tracked or in a case where moving speed of the target exceeds the chasing speed of the surveying device and an obstacle intercepts the optical path of the collimating telescope under the condition of continuous tracking in Step 09 and automatic tracking is interrupted, the display screen is changed over.

When the display screen is changed over, a scene taken by the image pickup unit 23 is displayed on the second display unit 18. Under the condition where the tracking is interrupted, the target is at a position deviated from the dotted circle 41 as shown in FIG. 6.

(Step 12) In case the target 13 does not appear even when the display screen has been changed over, magnification of the display image is changed so that a scene in wider range can be displayed. To change the magnification, magnification of optical system may be changed or magnification may be electrically changed through data processing of image data. Or, the change of optical magnification and the change of magnification by data processing may be carried out at the same time.

The change of magnification may be made by operation of the surveying operator by operating a button 43 for magnification change using a touch pen on the second display unit 18 or by transmitting a command for magnification change to the surveying device 1. Or, if the target 13 cannot be detected in the image data through the image processing by the image pickup control unit 31, it may be designed so that magnification can be automatically changed.

(Step 13) When the target 13 has been confirmed in the second display unit 18, the target 13 on the image is touched by a touch pen. The touched position on the second display unit 18 is transmitted to the second control arithmetic unit 35. At the second control arithmetic unit 35, collimation center of the distance measuring unit 21 or deviation in the collimating direction from the dotted circle 41 is calculated, and the result of calculation is sent to the first radio unit 33 via the second radio unit 37 as the collimating direction correcting data.

In case the second display unit 18 is not designed as a touch panel, remote control in the collimating direction may be performed while watching the image from the second operation input unit 20. Button, pointing device (mouse), etc. are included in the second operation input unit 20.

(Step 14) The first control arithmetic unit 29 receives deviation in the collimating direction via the first radio unit 33. Based on the deviation, the horizontal drive unit 24 and the vertical drive unit 26 are driven and the collimating direction of the telescope 8 is corrected.

(Step 15) When it is judged that the target is located within the tracking range by the correction of the collimating direction, it is changed over to the prism measurement screen (Step 06), and measurement and tracking are continued.

Next, description will be given on a case where a nonprism measurement is to be performed during the period when the prism measurement as described above is carried out.

(Step 10) When a mode changeover button 44 on the second display unit 18 of the remote control device 16 is operated by the touch panel, a prism measurement suspension command is issued and a measurement mode changing command is issued to the surveying device 1.

(Step 25) The measurement mode is changed to the nonprism measurement mode.

(Step 26 and Step 27) A scene is displayed on the second display unit 18. Magnification of the display image is adjusted, and an image within the range necessary for the nonprism measurement is displayed.

(Step 28) A measuring position is designated by a touch pen on the second display unit 18. The second control arithmetic unit 35 calculates deviation in the collimating direction from the designated measuring position and collimation center or from the dotted circle 41, and the results of calculation are transmitted to the first radio unit 33 via the second radio unit 37. Based on the deviation thus transmitted, the first control arithmetic unit 29 drives the horizontal drive unit 24 and the vertical drive unit 26, and the telescope 8 is directed toward the designated point and the nonprism measurement is performed. The results of measurement are transmitted to the remote control device 16 from the first radio unit 33 and are displayed on the second display unit 18. When the results of measurement are to be stored, if the image at the nonprism measurement is associated with the measurement results and these are stored, it will be easier to identify the results of measurement subsequently.

In case it is to be returned to the prism measurement mode from the nonprism measurement mode, it is shifted to the prism measurement of Step 02 by changing the mode after the measurement. In case the measurement is to be terminated from the nonprism measurement mode, the measurement operation is terminated by issuing a command not to change the mode.

Figure 7:
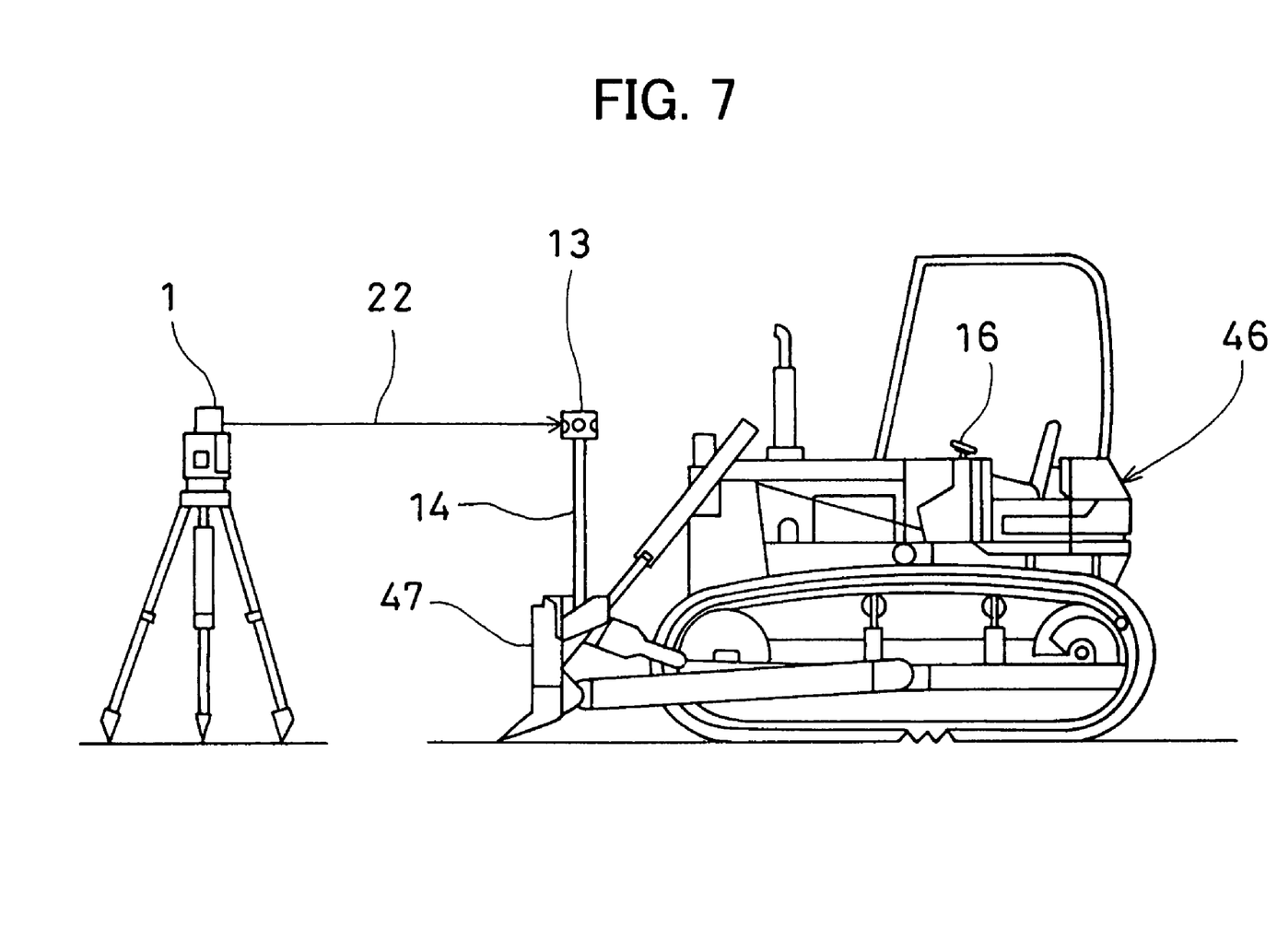
FIG. 7 is a drawing to explain another embodiment of the invention.
Figure 8A:
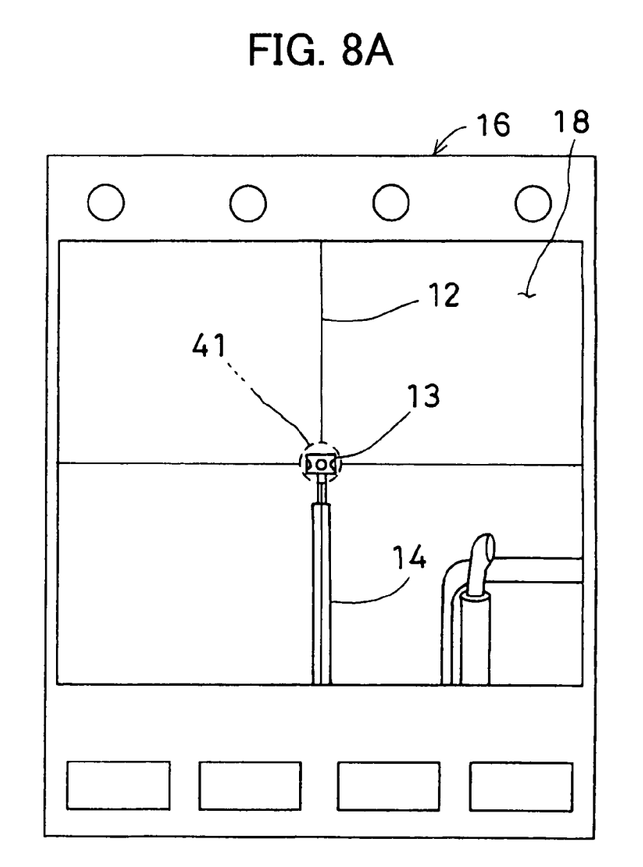
Figure 8B:
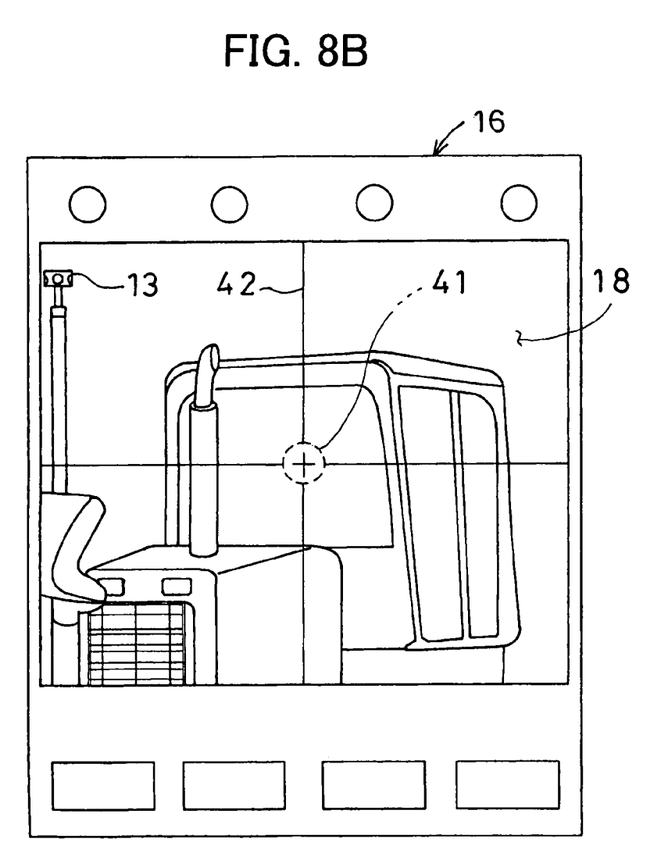

FIG. 7 and FIG. 8 each represents a case where the present invention is applied to civil engineering work such as ground-leveling work using a construction machine, for instance, a bulldozer 46 shown in the figure.

The remote control device 16 is installed in a cabin of the bulldozer 46, and an operator can carry out the operation while recognizing information displayed by the second display unit 18, and it is so designed that a control command can be transmitted to the surveying device 1 from the remote control device 16.

The pole 14, which supports the target 13, is erected on a bulldozer blade (soil-pushing blade) 47. The distance between the target 13 and edge of the bulldozer blade 47 is already known. By tracking and measuring the position of the target 13, height of the edge of the bulldozer blade 47, i.e. height of the ground-leveling surface can be determined.

Construction working data (i.e. finishing data aimed by civil engineering work) are stored in the first storage unit 32 or in the second storage unit 36 of the surveying device 1.

The construction working data are displayed as adequately on the second display unit 18, and the scene taken by the image pickup unit 23 is displayed in duplicated form on the second display unit 18. Further, the difference between the condition in the middle of working operation and the condition when the operation is completed can be confirmed by classifying the working data in different colors, and this contributes to the improvement of the working efficiency by the operator. When the operator selects the nonprism condition and designates a certain predetermined point in the surrounding on the image, the measurement result at that the predetermined point can be easily obtained, and the position of the operator and the conditions in the surrounding can be readily identified.

FIG. 8(A) shows a condition where the surveying device 1 is collimated to the target 13 (the condition where tracking can be made), and FIG. 8(B) shows the condition where the surveying device 1 misses the target 13.

What is claimed is:

1. A surveying system comprising, a surveying device provided with a function for tracking a target, and a remote control device for remotely controlling said surveying device on a target side,
    wherein said surveying device comprises a measuring unit, an image pickup unit, a first radio unit, and a first control arithmetic unit,
    and wherein said remote control device comprises a second radio unit, a second control arithmetic unit, a second display unit, and a second operation input unit,
    wherein said first control arithmetic unit transmits measurement data of said measuring unit to said remote control device via said first radio unit when a detection result is within the tracking range based on the detection result of a reflection light from the target, and transmits an image data taken by said image pickup unit via said first radio unit when said detection result is out of the tracking range,
    and wherein said second control arithmetic unit receives the measurement data and the image data via said second radio unit, and displays the measurement data or the image data on said second display unit.

2. A surveying system according to claim 1, wherein, under the condition when an image of said second display unit is displayed, a correction data in the collimating direction is transmitted to said surveying device via said second radio unit by said second operation input unit based on a display condition of the image,
    and wherein said first control arithmetic unit receives the corrected data via said first radio unit, and the correction is made so that the collimating direction is within the tracking range.

3. A surveying system according to claim 2, wherein said second display unit has a touch panel with the function to operate as an operation unit, and the correction data of the collimating direction to direct the collimating direction toward the target, can be acquired by designating a position of the target as displayed on said second display unit.

4. A surveying system according to claim 2, wherein the correction data of the collimating direction to direct the collimating direction toward the target can be acquired by designating the position of the target displayed on said second display unit by said second operation input unit.

5. A surveying system according to claim 1, wherein, when the target is not displayed on said second display unit, a command for magnification change inputted from said second operation unit is transmitted to said surveying device and magnification of the image data acquired by said image pickup unit can be changed.

6. A surveying system according to claim 1, wherein said measuring unit can measure a distance in a prism measurement mode and in a nonprism measurement mode,
    an image taken by said image pickup unit is displayed on said second display unit in the nonprism measurement mode,
    and a distance to a designated position can be measured by designating a required position in the image.

7. A surveying system according to claim 1, wherein said surveying device further comprises an image pickup control unit, and said image pickup control unit changes magnification of a display image when an image of the target is not detected within image data by an image processing.

* * * * *